United States Patent [19]

Otterbein et al.

[11] Patent Number: 5,563,789
[45] Date of Patent: Oct. 8, 1996

[54] SYSTEM TO GENERATE SIGNALS FOR CONTROL OR REGULATION OF A CONTROLLABLE OR REGULABLE CHASSIS

[75] Inventors: Stefan Otterbein; Rainer Kallenbach, both of Stuttgart, Germany

[73] Assignee: Robert Bosch GmbH, Stuttgart, Germany

[21] Appl. No.: 966,070

[22] PCT Filed: May 12, 1992

[86] PCT No.: PCT/DE92/00380

§ 371 Date: Jan. 15, 1993

§ 102(e) Date: Jan. 15, 1993

[87] PCT Pub. No.: WO92/20541

PCT Pub. Date: Nov. 26, 1992

[30] Foreign Application Priority Data

May 17, 1991 [DE] Germany .......................... 41 16 118.1

[51] Int. Cl.⁶ .................................................. B60G 17/08
[52] U.S. Cl. ..................................... 364/424.05; 280/707
[58] Field of Search ...................... 364/424.05; 280/707, 280/840, 6.1, DIG. 1

[56] References Cited

U.S. PATENT DOCUMENTS

| | | | |
|---|---|---|---|
| 3,807,678 | 4/1974 | Karnopp et al. | 248/62 |
| 5,062,657 | 11/1991 | Majeed | 280/707 |
| 5,062,658 | 11/1991 | Majeed | 280/707 |
| 5,071,157 | 12/1991 | Majeed | 280/707 |
| 5,096,217 | 3/1992 | Hanson et al. | 280/707 |
| 5,097,419 | 3/1992 | Lizell | 364/424.05 |
| 5,231,583 | 6/1993 | Lizell | 364/424.05 |
| 5,235,529 | 8/1993 | Hanson et al. | 280/707 X |
| 5,289,379 | 2/1994 | Williams | 364/424.05 |

FOREIGN PATENT DOCUMENTS

| | | |
|---|---|---|
| 0249209 | 12/1987 | European Pat. Off. . |
| 0264944 | 4/1988 | European Pat. Off. . |
| 0385231 | 11/1988 | European Pat. Off. . |
| 0335016 | 10/1989 | European Pat. Off. . |
| 0399365 | 11/1990 | European Pat. Off. . |
| 0420199 | 3/1991 | European Pat. Off. . |
| 0426340 | 5/1991 | European Pat. Off. . |
| 3408292 | 8/1985 | Germany . |
| 1485003 | 9/1977 | United Kingdom . |
| 90/15726 | 12/1990 | WIPO . |

OTHER PUBLICATIONS

German International Search Report, Completed Oct. 2, 1992.

*Primary Examiner*—Collin W. Park
*Attorney, Agent, or Firm*—Baker & Daniels

[57] ABSTRACT

Basing on signals (Vi) representing the vertical movements of the vehicle body at selected points (Pi) of the body, and basing on second signals (Xarvl', Xarvr', Xarhl', Xarhr') representing the relative movements between the wheel units and the body of the vehicle, the inventional system infers selected components of movement of the vehicle body, such as heave, roll and pitch movements or the vertical movement of the body at the front and rear axles as well as the roll movement. These components of movement are weighted differently. Basing on these differently weighted components of movement, second body movements are inferred at the points where the wheel suspension systems attach to the body. By comparison of the second body movements (Vagvl, Vagvr, Vaghl, Vaghr) to the pertaining relative movements between the wheel units and the body there are actuation signals formed for the respective suspension system, in a way such that the selected components of movement can be influenced separately from one another in the sense of a reduction.

7 Claims, 3 Drawing Sheets

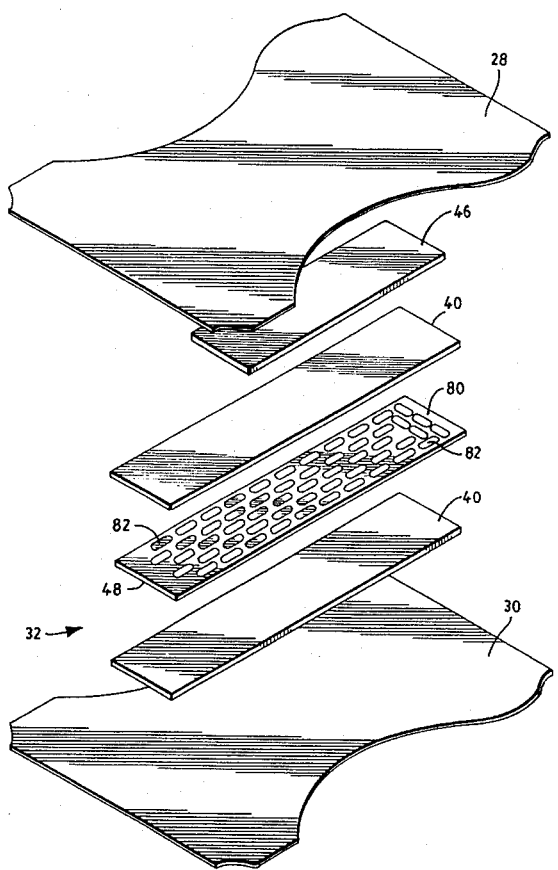
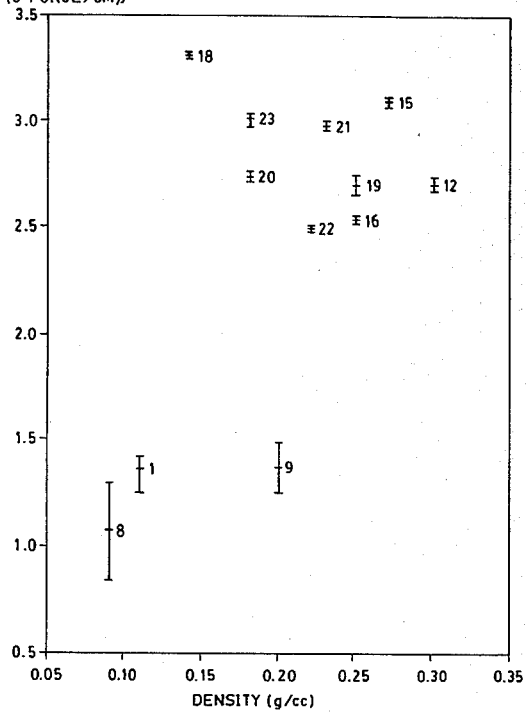

SYSTEM TO GENERATE SIGNALS FOR CONTROL OR REGULATION OF A CONTROLLABLE OR REGULABLE CHASSIS

PRIOR ART

The invention is based on a system according to the category of the main claim.

To improve the travel comfort of passenger cars or trucks, the design of the chassis is of considerable significance. Necessary for it are sufficient spring and/or damping systems as components of a chassis.

With passive chassis, which presently continue to be used predominantly, the spring and/or damping systems are designed at the time of installation to be either relatively hard ("sporty") or relatively soft ("comfortable"), depending on the predicted use of the vehicle. Influencing the chassis characteristic during the travel operation is not possible with these systems.

With active chassis, in contrast, the characteristic of the spring and/or damping systems can be influenced during the travel operation in the sense of a control or regulation, depending on the state of travel.

What must first be considered for the control or regulation of such an active chassis are the needs of the passengers and cargo as well as the type of road surface. Viewed as impairments of travel comfort by the passengers or by a cargo sensitive to shocks are the vertical movements of the vehicle body. the causes of these vehicle body movements are stimulations by road surface unevennesses and variations of the state of travel, such as steering, braking and acceleration.

A minimization of the vehicle body movements results in a high travel comfort. To counteract the vehicle body movements by an active spring and/or damping system in a diminishing way, the U.S. Pat. No. 3,807,678 describes a system for chassis control where the vehicle body is isolated from stimulations by the road surface unevennesses. To that end, suspension systems are arranged between the body and wheels of a chassis in such a way that a force can be applied between the body and the wheels. This force is determined by comparisons of sensed relative movements between vehicle body and wheels to sensed body movements. Such a system for minimization of body movements is generally called a "skyhook control."

A disadvantage of this system is constituted in that the minimization of the body movements is performed separately for each system comprised of a wheel unit and the prorated vehicle body and of the suspension arranged between wheel unit and vehicle body. This "local" version of the skyhook control thus makes no allowance for the collective body movements, such as heave, roll and pitch movements or the vertical movement of the body at the front and rear axles. Such collective body movements, e.g., are the consequence of steering, braking and accelerating maneuvers.

The problem underlying the present inventional system is to influence selected components of movement independently from one another and at different weighting, in the framework of influencing the body movements.

ADVANTAGES OF THE INVENTION

As compared to the prior art, the present invention offers the advantage that selected components of movement, such as heave, roll and pitch movements or the vertical movement at the front and rear axles, can be influenced along with the roll movement, separately from one another and to different extents.

According to the invention, signals are determined which represent the vertical movement of the body at selected points. Basing on these signals, specific components of movement are inferred, making it possible to weight these components differently. These weightings may be effected, e.g., under allowance for the state of travel of the vehicle, such as braking, acceleration and steering.

Basing on these differently weighted motive components, weighted vertical movements of the body are inventionally inferred at points where the wheel suspension systems attach to the body.

Moreover, signals are determined which represent the relative movements between the wheel units and the body of the vehicle (spring deflection movements).

By comparing the weighted vertical movements at the points where the wheel suspension systems attach to the body to the pertaining relative movements between the wheel units and the vehicle body, actuation signals for the respective suspension system are formed in such a way that the selected components of movement can be influenced separately from one another in the sense of a reduction.

To influence the movements of the vehicle body, suspension systems are arranged between a wheel unit each and the body, which suspension systems can influence the movements between the wheel units and the vehicle body. The suspension systems may consist, e.g., of spring and/or damping systems. For control or regulation of the chassis, the spring and/or damping systems are configured to be adjustable in such a way that the spring or damping properties of the adjustable spring and/or damping systems are adjustable at least in two stages, that is, that the spring and/or damping systems to be controlled/regulated feature at least two spring and/or damping characteristics.

BRIEF DESCRIPTION OF THE DRAWINGS

An embodiment of the invention is illustrated in the drawings and will be more fully explained in the following description.

FIG. 1 shows a spatial vehicle model, while FIG. 2, 3 and 4 illustrate the essential elements of the inventional system in the framework of this embodiment.

DESCRIPTION OF THE PREFERRED EMBODIMENT

The preferred embodiment depicts the inventional system for control or regulation of a chassis with the aid of a block diagram. The vehicle comprises in this embodiment four wheel units and two axles, the chassis, and adjustable dampers whose characteristic is adjustable in at least two stages.

Figure 1:
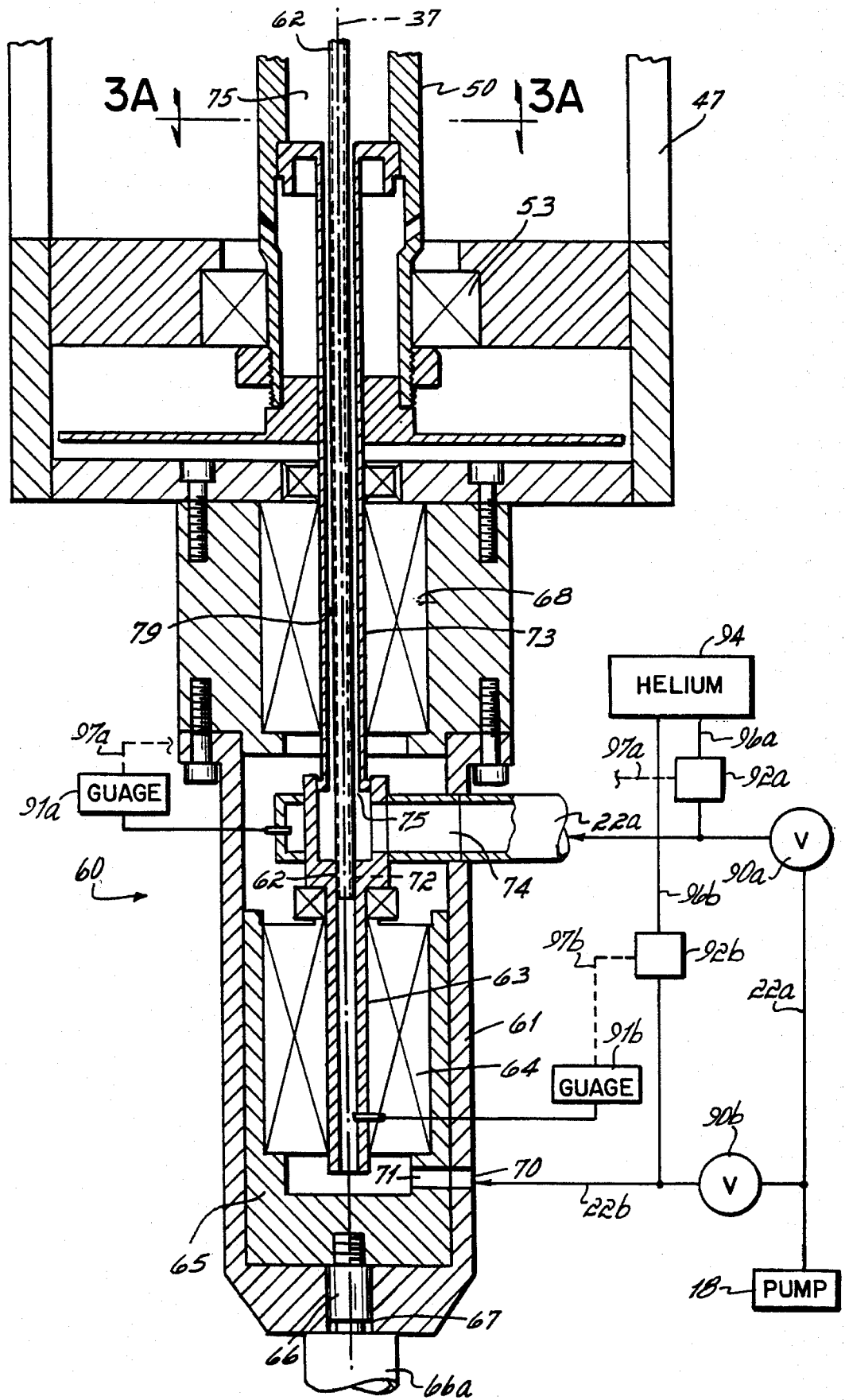

FIG. 1 shows a simple spatial model of a longitudinally symmetric, four-wheel and two-axle vehicle. In the following, index i designates the pertaining axle; that is, index i=h indicates the properties pertaining to the rear axle while i=v stands for the properties pertaining to the front axle. Reference 30 represents spring and damping systems comprised each of a spring with the spring constant $C_i$ and a damper of parallel arrangement with the damping constant $d_i$. The wheels are referenced 31 and described in model fashion each by the successively arranged bodies with the masses $M_{ri}$ and the spring representing the stiffness of the tire with the spring constant Cri. The road surface is marked 33, while the body with the mass Mk is referenced 32. The center of gravity S of the vehicle body is located a distance a from the front axle and a distance c from the rear axle, while b signifies one-half the track.

Figure 2:
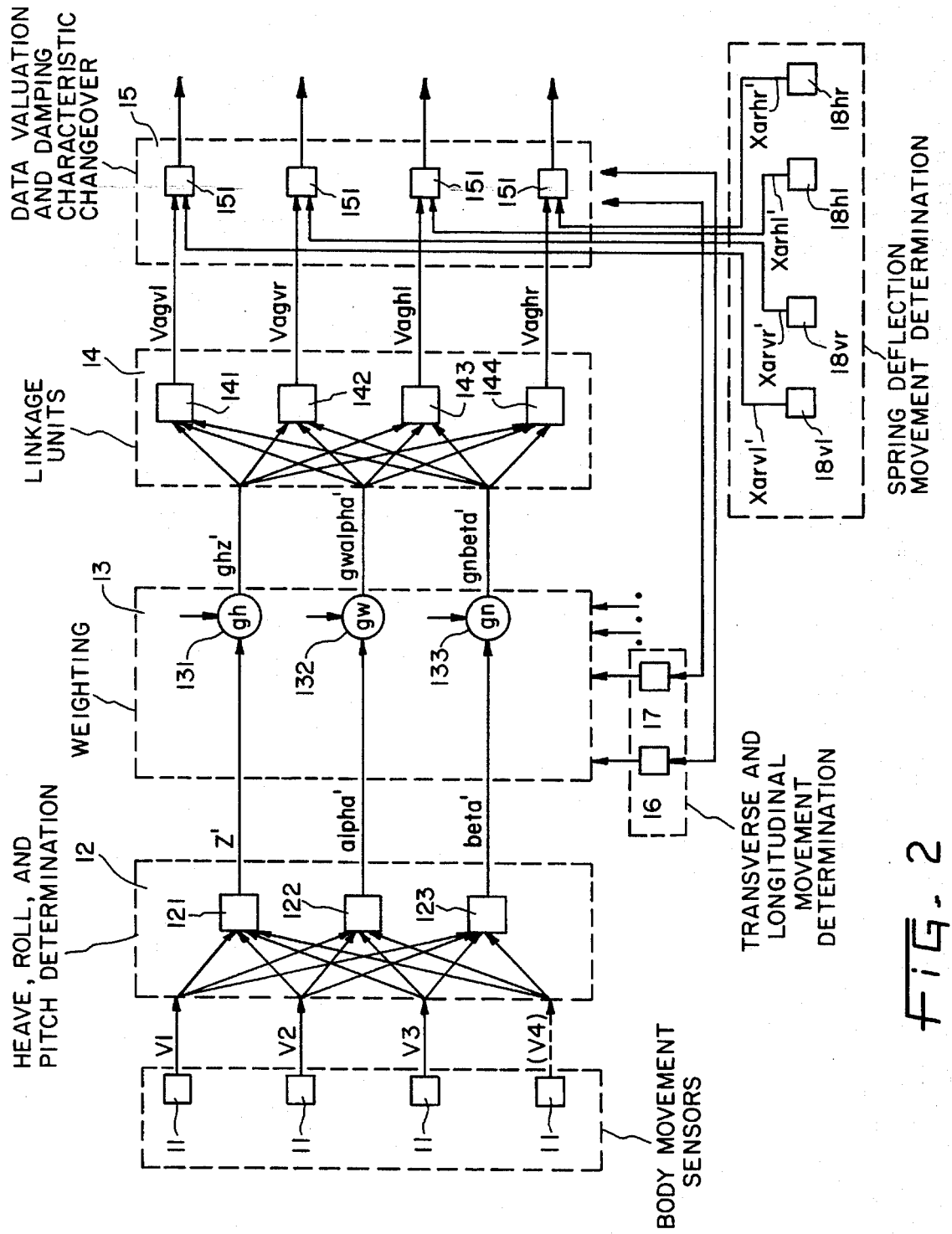

FIG. 2 shows in the framework of this embodiment the essential elements of the system. Referenced 11 are first means for determining the vehicle body movements, while reference 12 denotes within a dashed border second means for determination of the selected components of movement with linkage units 121, 122 and 123. Reference 13, within dashed bordering, represents third means for the weighting, with 131, 132 and 133 referencing multiplicative and/or additive linkages. References 14 and 15 represent fourth means for linkage and fifth means for data valuation and changeover of the damping characteristic, with reference 14 showing in dashed bordering a combination of linkage units 141, 142, 143 and 144, while reference 15 shows in dashed bordering a combination of logic units 151. Marked 16 and 17 are sixth means for determination of the transverse and longitudinal movements of the vehicle. References (18$ij$) are eighth means for determination of the spring deflection movements.

FIG. 3 shows the mode of operation of the logic units 151, with 1511 indicating a data retrieval, 1512 and 1513 value comparisons, and 1514 and 1515 means for changeover of the damping characteristic. Fed to the data retrieval 1511 are set values and/or the signals—sensed in the eighth means (18$ij$)—representing the spring deflection movements, and/or signals of the means 16 and 17 and/or variables representing or influencing the state of travel, such as the travel speed and/or ambient temperature.

In FIG. 4, reference 41 indicates ninth means for error recognition, to which the signals of the first means (11) for determination of the vehicle body movements are relayed. Referenced 42 and 43 are tenth means for data valuation and eleventh means for error display.

The following will illustrate, with the aid of FIGS. 1, 2, 3 and 4, the mode of operation of the system for generating signals for control or regulation of an active chassis as described in this embodiment.

Determined in the first means (11) are first signals (Vi) representing indirectly or directly the velocities of the vehicle body in vertical direction at selected points (Pi) of the body. The first signals (Vi), e.g., may be obtained by integration of acceleration sensor signals, the acceleration sensors being so fastened on the vehicle body at points (Pi) that they will capture the vertical accelerations of the vehicle body. The conditions for selection of the points (Pi) will be addressed yet in greater detail in the course of this description.

The first signals (Vi) now are passed to the second means (12) where they are linked to one another. This linkage occurs in the units 121, 122 and 123.

This linkage unit, the same as all others of the system, can be realized in electronic digital or electronic analog fashion using electronic components, by simulation of a matrix representing the linkage properties.

The linear linkages of the first signals (Vi) among one another in the second means (12) can be represented mathematically in matrix notation, requiring a differentiation between two cases:

First Case:

Represented by the first signals (V1, V2, V3) are the vertical velocities of the vehicle body in vertical direction at three selected points (P1, P2, P3) of the body. In this case, the linkage in the second means (12) is obtained by the following matrix $$1/(det A) * \begin{vmatrix} x2*y3 - x3*y2 & x3*y1 - x1*y3 & x1*y2 - x2*y1 \\ -(x2-x3) & -(x3-x1) & -(x1-x2) \\ -(y2-y3) & -(y3-y1) & -(y1-y2) \end{vmatrix} \quad (1)$$

where det A=(y2–y3)*x1+(y3–y1)*x2+(y1–y2)*x3 and xi and yi are the coordinates of the point (Pi) with regard to a body-fixed coordinate system with the center of gravity of the body as zero point, where the index i=1,2,3 and the vehicle body is in model fashion assumed to be two-dimensional, and the coordinates (xi, yi) of the points (Pi) are so selected that (det A) is not zero.

In the second means (12) the first signals (V1, V2, V3) are thus combined linearly as described hereafter.

$$\begin{vmatrix} z' \\ alpha' \\ beta' \end{vmatrix} = 1/(det A)* \begin{vmatrix} x2*y3 - x3*y2 & x3*y1 - x1*y3 & x1*y2 - x2*y1 \\ -(x2-x3) & -(x3-x1) & -(x1-x2) \\ -(y2-y3) & -(y3-y1) & -(y1-y2) \end{vmatrix} * \begin{vmatrix} V1 \\ V2 \\ V3 \end{vmatrix}$$

The linkages among one another are obtained in mathematically formal fashion by matrix multiplication of the three-component vector (V1, V2, V3) by the matrix (1). The individual units 121, 122 and 123 may be laid out as multiplying or adding units, for instance according to the vector matrix multiplication algorithm, as follows.

Unit 121:
1/(det A) * [V1*(x2*y3–x3*y2)+V2*(x3*y1–x1*y3)+V3*(x1*y2–x2*y1)]

Unit 122:
1/(det A) * [–V1*(x2–x3)–V2*(x3–x1)–V3*(x1–x2)]

Unit 123:
1/(det A) * [–V1*(y2–y3)–V2*(y3–y1)–V3*(y1–y2)]

Second Case:

The first signals V1, V2, V3, V4 represent the vertical velocities of the vehicle body in vertical direction at four selected points (P1, P2, P3, P4) of the body. In this case, the linkage in the second means (12) is given by the following matrix $$1/2 * \begin{pmatrix} B11 & B12 & B13 & B14 \\ B21 & B22 & B23 & B24 \\ B31 & B32 & B33 & B34 \end{pmatrix} \quad (2)$$

where

B11=B12=–x3/(x1–x3) and

B13=B14=x1/(x1–x3) and

B21=–B22=y1/(y1$^2$+y3$^2$) and

B23=–B24=y3/(y1$^2$+y3$^2$) and

B31=B32=–1/(x1–x3) and

B33=B34=1/(x1–x3) and xi and yi are the coordinates of the point (Pi) with regard to a body-fixed coordinate system with the center of gravity of the body as zero point, where the index i=1,2,3,4 and the vehicle body is in model fashion assumed to be two-dimensional, and the coordinates (xi, yi) of the points (Pi) are so selected that x3 is not equal to x1, $y1^2+y3^2>0$, x2=x1, y2=−y1, x4=x3 and y4=−y3.

In the second means (12) the signals (V1, V2, V3, V4) are thus linearly combined as described hereafter.

$$\begin{pmatrix} z' \\ alpha' \\ beta' \end{pmatrix} = 1/2 * \begin{pmatrix} B11 & B12 & B13 & B14 \\ B21 & B22 & B23 & B24 \\ B31 & B32 & B33 & B34 \end{pmatrix} * \begin{pmatrix} V1 \\ V2 \\ V3 \\ V4 \end{pmatrix}$$

The linkages among one another are obtained in mathematically formal fashion by matrix multiplication of the four-component vector (V1, V2, V3, V4) by the matrix (2). The individual units 121, 122 and 123 can in this case be configured as multiplying and adding units, for instance according to the vector matrix multiplication algorithm, as follows.

Unit 121: 1/2 * (V1*B11+V2*B12+V3*B13+V4*B14)
Unit 122: 1/2 * (V1*B21+V2*B22+V3*B23+V4*B24)
Unit 123: 1/2 * (V1*B31+V2*B32+V3*B33+V4*B34),
where the variables Bij are defined as described above.

The linkage results (z', alpha' and beta') prevailing in both cases on the outputs of the second means (12), respectively on the outputs of the filter units (121, 122, 123), represent the heave, roll and pitch velocities. The pivots of the vehicle body about its longitudinal or transverse axis are signified here by alpha or beta, respectively, and the vertical displacement of the center of gravity of the body by z. Alpha', beta' and z' are the respective first time derivations of the variables alpha, beta and z.

The third signals (z', alpha', beta') representing the heave, roll and pitch velocities of the vehicle body are weighted in the third means (13) by the linkages 131, 132 and 133. This takes place by multiplications of the third signals (z', alpha' beta') by the variables gh, gw and gn and may be effected separately from one another.

The weighting of the third signals (z', alpha', beta') in the third means (13) is favorably carried out depending on the travel dynamics, such as longitudinal and/or transverse movements of the vehicle, and/or the ambient temperature. To be understood as travel dynamics are here specifically the transverse and/or longitudinal acceleration of the vehicle and/or the travel speed. The travel dynamics may be captured, for instance in the sixth means (16, 17) as described hereafter:

The transverse movements of the vehicle can be determined from signals of a steering angle sensor, with these signals being utilized also for a servo steering control or regulation.

longitudinal movements of the vehicle can be determined from signals of wheel speed sensors which, e.g., are used also for an antilock system.

The longitudinal and/or transverse movements of the vehicle can be determined from signals of appropriately positioned acceleration sensors.

The longitudinal movements of the vehicle can be determined by the position of the gas pedal and/or brake pedal actuated by the driver.

In summary, it can be said regarding the influencings in the third means (13) that here a definitive influencing of the heave, roll and pitch movements is possible, for instance to emphasize or dampen a specific movement especially in the subsequent data evaluation and changeover of the damping characteristic. Thus, the weighting will favorably be selected depending on steering, braking and acceleration maneuvers of the vehicle, in order to cause the roll and pitch movements of the vehicle body initiated thereby to ebb off swiftly.

In a simple configuration of the inventional system, the third means (13) may be circumvented. However, a specific influencing of the various motive components is then not possible.

In the case of a four-wheel, two-axle vehicle where spring and/or damping systems are arranged between each wheel and the vehicle body, the weighted linkage results (gb * z', gw * alpha, gn * beta) prevailing on the output of the third means (13) or the uninfluenced linkage results (z', alpha', beta') which under circumvention of the third means (13) prevail on the outputs of the seconds means (12) are linked among one another in the fourth means (14), which latter can be characterized in matrix notation as follows:

$$\begin{pmatrix} 1 & b1 & -a1 \\ 1 & -b1 & -a1 \\ 1 & b2 & a2 \\ 1 & -b2 & a2 \end{pmatrix} \tag{3}$$

where a1 is the distance between the center of gravity of the vehicle body and the damper attachment points above the front axle, a2 is the distance between the center of gravity of the vehicle body and the damper attachment points above the rear axle, 2*b1 is the distance of the damper attachment points on the vehicle body above the front axle, and 2*b2 is the distance of the damper attachment points on the body above the rear axle.

Hence, the weighted linkage results (gh * z', gw * alpha', gn * beta') or the unweighted third signals (z', alpha', beta') are linearly combined in the fourth means (14) as described hereafter. Carried out explicitly here is only the case where the weighted linkage results (gh * z', gw * alpha', gn * beta') are processed in the fourth means (14). The unweighted third signals (z', alpha', beta') are processed analogously.

$$\begin{pmatrix} Vagvl \\ Vagvr \\ Vaghr \\ Vaghl \end{pmatrix} * \begin{pmatrix} 1 & b1 & -a1 \\ 1 & -b1 & -a1 \\ 1 & b2 & a2 \\ 1 & -b2 & a2 \end{pmatrix} * \begin{pmatrix} gh * z' \\ gw * alpha' \\ gn * beta' \end{pmatrix}$$

The linkages among one another are obtained in mathematically formal fashion by matrix multiplication of the three-component vector (gh * z', gw * alpha', gn * beta') by the matrix (3). The individual units 141, 142, 143 and 144 may in this case be configured, for instance according to the vector matrix multiplication algorithm, as multiplying and adding units as follows.

Unit 141: gh * z'+(gw * alpha'*b1)−(gn * beta' * a1)
Unit 142: gh * z'−(gw * alpha'*b1)−(gn * beta' * a1)
Unit 143: gh * z'+(gw * alpha'*b2)+(gn * beta' * a2)
Unit 144: gh * z'−(gw * alpha'*b2)+(gn * beta' * a2),
where the variables a1, a2, b1, b2 are defined as described above.

Prevailing as results of the linkages on the outputs of the fourth means (14) are the linkage results (Vagvl, Vagvr, Vaghl, Vaghr) representing the weighted vehicle body velocity in vertical direction at the points where the wheel suspension systems attach to the body.

The linkage results (Vagvl, Vagvr, Vaghl, Vaghr) thus obtained are passed on to the fifth means (15). Here, the mathematical signs and amounts of the linkage results (Vagvl, Vagvr, Vaghl, Vaghr) are analyzed and adjustments made of the respective adjustable damping system, depending on the mathematical sign and magnitude of the amount.

This is done separately for each wheel suspension system in the logic units 151, the mode of operation of which is illustrated in FIG. 3. Entered by the data retrieval 1511 are set values Sij and/or the signals (Xarij) of the eighth means (18ij) and/or signals of the sixth means (16, 17) and/or variables representing or influencing the state of travel, such as the vehicle speed and/or ambient temperature. Index i always stands for the front or rear position on the vehicle, index j always for the right or left position on the vehicle.

Determined in the eighth means (18ij) are the relative movements between the wheel units and the vehicle body. To that end, second signals (Xarhl', Xarhr', Xarvl', Xarvr') representing the spring deflection velocities between the wheel units and the body are captured indirectly or directly. This may be accomplished by capturing the spring deflection velocities using appropriate sensors and/or by capturing the spring deflection paths and subsequent differentiation.

The linkage results (Vagvl, Vagvr, Vaghl, Vaghr) are compared each to a set value Sij in the value comparison (1512). This set value may assume a constant value for the respective damping system and/or depend on variables representing or influencing the state of travel, such as transverse movements, longitudinal movements, travel speed and/or ambient temperature.

If the amount |Vagij| of the linkage results is smaller than the pertaining set value Sij, the signal N prevails on the output of the value comparison (1512). In this case, no changeover of the damping characteristic is performed.

If the amount |Vagij| of the linkage results is greater than the pertaining set value Sij, the signal Y prevails on the output of the value comparison (1512). In this case, the mathematical sign of the product Vagij * Xarij' is analyzed in the unit (1513).

If this product Vagij * Xarij' is greater than zero, the signal Y prevails on the output of unit (1513), if it is less than zero, the signal N.

The signal Y on the output of unit (1513) is transmitted to the first means (1515) for changeover of the damping characteristic, where a changeover to a harder damping characteristic of the respective damping system is carried out.

The signal N on the output of unit (1513) is transmitted to the second means (1514) for changeover of the damping characteristic, where a changeover to a softer damping characteristic of the respective damping system is performed.

An advancement of the arrangement of units (1512) for data valuation and changeover of the damping characteristic as described above as an embodiment may be constituted by comparing the amounts of the linkage results (Vagij) to several pertaining set values S1ij, S2ij, S3ij . . . This may favorably be performed in several value comparisons (1512/1, 1512/2, 1512/3 . . . . Depending on the more detailed amount value of |Vagij| thus obtained, specific damping characteristics of the respective damping system can be adjusted, whereas with the arrangement (FIG. 3) described as embodiment only the next harder or next softer stage will be activated.

An especially simple embodiment of the inventional system is the two-stage configuration of the damping systems with a hard and a soft chassis characteristic. In this case, the stages "hard" or "soft" are adjusted in the means for changeover of the damping characteristic 1514 or 1515.

In the embodiment described so far, the heave, roll and pitch movements have been selected as motive components which can be weighted independently from one another and to different extents. However, this is not mandatory; basically, selective components of movement of the vehicle body may be based upon. Important for the arrangements is the case in which the vertical movement of the body on the front and rear axles as well as the roll movement are selected as components. However, this necessitates a computation and weighting procedure which deviates slightly from that illustrated in FIG. 2. Therefore, this modified procedure is briefly illustrated.

1. Determination of heave, roll and pitch velocities from measured vertical body movements at individual—three or four—points (as in the embodiment described already).

2. Computation of the vertical velocities of the body ($z_v'$, $z_h'$) at the front and rear axles from the determined heave and pitch velocities according to $$z_v'=z-a * beta'$$

$$z_h'=z-c * beta'$$

3. Weighting the velocities $z_v'$, $z_h'$ and the pitch velocity alpha (independently from one another):

$$z_{vg}'=gvo * z_v'$$

$$z_{hg}'=ghi * z_h'$$

$$alpha_g'=gw * alpha'$$

The weighting factors gvo, ghi and gw may favorably be selected depending on variables representing and/or influencing the state of travel, such as the travel speed, braking, steering and/or acceleration maneuvers of the vehicle and/or ambient temperature.

4. Computation of the weighted heave and pitch velocities $z_g'$ and $beta_g'$ from the weighted velocities $z_{vg}'$ and $z_{hg}'$:

$$z_g'=[c/(a+c)] * z_{vg}'+[a/(a+c)] * z_{hg}'$$

$$beta_g'=-[1/(a+c)] * z_{vg}'+[1/(a+c)] * z_{hg}'$$

It should be noted that the steps 2 through 4 may also be combined as described in the following:

$$\begin{pmatrix} z_g' \\ alpha_g' \\ beta_g' \end{pmatrix} = \begin{pmatrix} g11 & 0 & g12 \\ 0 & g22 & 0 \\ g31 & 0 & g33 \end{pmatrix} * \begin{pmatrix} z' \\ alpha' \\ beta' \end{pmatrix} \quad (4)$$

where g11=[c/(a+c)] * gvo+[a/(a+c)] * ghi g13=−[(a*c)/(a+c)] * [gvo−ghi]

g22=gw g31=−[1/(a+c)] * [gvo−ghi]

g33=[a/(a+c)] * gvo+[c/(a+c)] * ghi

5. Computation of the weighted body velocities (Vagvl, Vagvr, Vaghl, Vaghr) in vertical direction at the attachment points of the dampers to the body from the weighted heave, roll and pitch velocities according to:

$$\begin{pmatrix} Vagvl \\ Vagvr \\ Vaghl \\ Vaghr \end{pmatrix} = \begin{pmatrix} 1 & b1 & -a1 \\ 1 & -b1 & -a1 \\ 1 & b2 & a2 \\ 1 & -b2 & a2 \end{pmatrix} * \begin{pmatrix} z'g \\ alpha'g' \\ beta'g \end{pmatrix}$$

(as already in the described embodiment).

If in the first means (11) the first signals (Vk, with k=1 through 4) representing the velocities of the vehicle body in vertical direction at four selected points (P1, P2, P3, P4) of the body are determined, another favorable embodiment of the inventional system is arrived at, as described hereafter.

By capturing the vertical body velocities at four points, agreement exists regarding the determination of the three motive components heave, pitch and roll movement. This may be utilized for error recognition of the sensor system and/or for signal processing of the inventional system.

To that end, as illustrated in FIG. 4, the first signals (Vk, with k=1 through 4) are fed to the ninth means (41). These ninth means (41) link the first signals (Vk, with k=1 through 4) to the coordinates of the points (Pi) where the body movements are determined. This linkage satisfies the following mathematical rule:

$$r = \sum_{i=1}^{4} \left( \sum_{k=1}^{4} rik * Vk \right)^2 ,$$

where the elements rik are given by the matrix R $$R = 1/2 * [1/(y1^2 + y3^2)] * \begin{pmatrix} -y3^2 & y3^2 & y1*y3 & -y1*y3 \\ y3^2 & -y3^2 & -y1*y3 & y1*y3 \\ y1*y3 & -y1*y3 & -y1^2 & y1^2 \\ -y1*y3 & y1*y3 & y1^2 & -y1^2 \end{pmatrix}$$

and yi represent the coordinates of the point (Pi) in the transverse direction of the vehicle with regard to a body-fixed coordinate system having the center of gravity of the body as zero point, where the index i=1,2,3,4, y2=−y1 and y4=−y3 and the vehicle body is in model fashion assumed to be two-dimensional.

The output signal (r) of the ninth means (41) is now compared in the comparator unit (42) to the specified thresholds (tuning parameters). If the value (r) exceeds this threshold, an error signal (F) is displayed.

We claim:

1. A semi-active control system for controlling and regulating a vehicle, said vehicle including a vehicle body which is subject to heave, pitch, and roll movements, said body connected to a plurality of wheels disposed on at least two axles, a plurality of adjustable suspension systems, said plurality of suspension systems connected at respective attachment points to said body and to respective said wheels, said plurality of suspension systems adjustable to influence movements of respective wheels relative to said body, said control system comprising:

means for determining a plurality of first signals which respectively represent velocities of first body movements at respective preselected points of said body;

means for generating second signals which respectively represent movements of respective wheels relative to said body;

control means for controlling said suspension systems, said control means including:

means for determining first components of movement of said vehicle body based on said first signals and generating third signals representing said first components, said first components of movement including only vertical movements of said body at the axles and roll movements of said body;

means for determining second body movement signals of said body based on said first components, said second body movement signals representing movement velocities of said vehicle body at said plurality of attachment points; and means for generating actuation signals for actuating said plurality of suspension systems, said actuation means comparing said second body movements to said second signals and generating comparison signals, said actuation means weighting said comparison signals and generating said actuation signals for adjusting said suspension systems to influence said first components independently of one another.

2. The system of claim 1 for controlling and regulating a vehicle wherein each suspension system includes at least one of a deflectable spring system and a damping system, said control means including means for adjusting said suspension systems in discrete steps.

3. The system of claim 1 for controlling and regulating a vehicle which includes steering angle sensors, wheel speed sensors, acceleration sensors, and a pedal, said system further comprising means for determining the state of travel of said vehicle, said state of travel determining means including at least one of:

means for determining transverse movements of the said vehicle body from signals generated by the said steering angle sensors;

means for determining longitudinal movements of the said vehicle body from signals generated by the said wheel speed sensors;

means for determining longitudinal and transverse movements of the said vehicle body from signals generated by the said acceleration sensors; and means for determining longitudinal movements of the vehicle by the position of the said pedal.

4. The system of claim 1 for controlling and regulating a vehicle which includes a plurality of acceleration sensors disposed at said preselected points, wherein said first signal determining means integrates signals generated by the said acceleration sensors, said first signals representing vertical accelerations of said preselected points of the said vehicle body.

5. The system of claim 1 wherein said second signal generating means determines said second signals with at least one of:

sensor means for measuring spring deflection velocities of the said suspension systems; and differential means including means for measuring spring deflections of the said suspension systems and means for differentiating said measured spring deflections to calculate spring deflection velocities of the said suspension systems.

6. The system of claim 1 for controlling and regulating a four wheel, two axle vehicle having a plurality of adjustable suspension systems, each suspension system capable of exerting a hard damping force and a soft damping force, wherein said actuating signal generating means includes means for providing linkage of signals including signals from said third signals and weighted signals based on said third signals, said linkage providing means calculating linkage signals which represent weighted vertical body velocities at said respective attachment points, and said linkage providing means calculating said linkage signals according to the matrix:

$$\begin{vmatrix} 1 & b1 & -a1 \\ 1 & -b1 & -a1 \\ 1 & b2 & a2 \\ 1 & -b2 & a2 \end{vmatrix}$$

where

- a1 is the distance between the center of gravity of the vehicle body and said attachments points of the suspension systems above a front axle,
- a2 is the distance between the center of gravity of the vehicle body and said attachments points of the wheel suspension system above a rear axle,
- 2*b1 is the distance of said attachment points to the vehicle body above the front axle, and
- 2*b2 is the distance of said attachment points to the vehicle body above the rear axle, and
- said second body movement signal determining means determining signals which represent spring deflection velocities of the said suspension systems;
- said system further comprising means for analyzing said second body movement signals on the basis of their magnitude and means for adjusting respective said suspension systems depending on the magnitude of said linkage signals, said adjusting means adjusting a respective one of said suspension systems to a harder damping force if the direction of the corresponding second body movement signal is the same as the direction of the relative spring deflection velocity, and said adjusting means adjusting a respective one of said suspension systems to a softer damping force if the direction of the corresponding second body movement and the direction of the pertaining spring deflection velocity are opposite.

7. The system of claim 1 wherein said first signals represent the vertical velocities of the vehicle body at four preselected points of the vehicle body, said chassis control system further comprising means for determining an error condition in said chassis control system, said error determining means generating a signal r determined by the equation:

$$r = \sum_{i=1}^{4} \left( \sum_{k=1}^{4} r_{ik} * V_k \right)^2,$$

where said first signals are represented by $V_k$, with k ranging from 1 to 4, with the elements $r_{ik}$ given by the matrix R:

$$R = 1/2 * 1/(y1^2 + y3^2) * \begin{vmatrix} -y3^2 & y3^2 & y1*y3 & -y1*y3 \\ y3^2 & -y3^2 & -y1*y3 & y1*y3 \\ y1*y3 & -y1*y3 & -y1^2 & y1^2 \\ -y1*y3 & y1*y3 & y1^2 & -y1^2 \end{vmatrix}$$

and yi being the coordinate of said selected point, of index i, in a transverse direction of the vehicle body with respect to a vehicle body-fixed two-dimensional coordinate system having a center of gravity of the vehicle body as zero point, where the index i=1,2,3,4, and the signal r is compared to predetermined thresholds and an error signal is displayed if said thresholds are exceeded.

\* \* \* \* \*